US012655787B2

(12) United States Patent
Song

(10) Patent No.: US 12,655,787 B2
(45) Date of Patent: Jun. 16, 2026

(54) DUAL PISTON BASED GENSETS FOR VEHICLE ELECTRIFICATION

(71) Applicant: Xubin Song, Bloomfield Hills, MI (US)

(72) Inventor: Xubin Song, Bloomfield Hills, MI (US)

(73) Assignee: ePower Mobility LLC, Bloomfield Hills, MI (US)

( * ) Notice: Subject to any disclaimer, the term of this patent is extended or adjusted under 35 U.S.C. 154(b) by 294 days.

(21) Appl. No.: 18/368,672

(22) Filed: Sep. 15, 2023

(65) Prior Publication Data

US 2025/0092819 A1 Mar. 20, 2025

(51) Int. Cl.
| | |
|---|---|
| *F02B 75/30* | (2006.01) |
| *F02B 41/04* | (2006.01) |
| *F02B 63/04* | (2006.01) |
| *F02B 75/04* | (2006.01) |
| *F02B 75/18* | (2006.01) |
| *F02B 75/28* | (2006.01) |
| *H02K 7/116* | (2006.01) |
| *H02K 7/18* | (2006.01) |

(52) U.S. Cl.
CPC .............. *F02B 75/30* (2013.01); *F02B 41/04* (2013.01); *F02B 63/04* (2013.01); *F02B 75/045* (2013.01); *F02B 75/18* (2013.01); *F02B 75/287* (2013.01); *H02K 7/116* (2013.01); *H02K 7/1815* (2013.01)

(58) Field of Classification Search
CPC ........ F02B 75/287; F02B 75/18; F02B 75/30; F02B 75/045; F02B 41/04; F02B 41/06; F02B 63/04; H02K 7/116; H02K 7/1815
See application file for complete search history.

(56) References Cited

U.S. PATENT DOCUMENTS

| | | | | |
|---|---|---|---|---|
| 169,249 | A * | 10/1875 | Frank ...................... | F15B 11/20 |
| | | | | 91/181 |
| 336,505 | A * | 2/1886 | Atkinson .............. | F02B 75/042 |
| | | | | 123/78 F |
| 367,496 | A * | 8/1887 | Atkinson .............. | F02B 75/048 |
| | | | | 123/78 F |
| 8,578,695 | B1 * | 11/2013 | Fluhler ................... | F02D 15/00 |
| | | | | 60/660 |
| 8,739,754 | B2 * | 6/2014 | Yan ........................ | F02B 75/044 |
| | | | | 123/78 AA |
| 8,875,674 | B2 * | 11/2014 | Yan ........................ | F02B 75/32 |
| | | | | 123/197.1 |
| 9,133,763 | B2 * | 9/2015 | Yan ........................ | F02B 75/02 |
| 2021/0239039 | A1 * | 8/2021 | Collett ................... | F02B 25/08 |
| 2024/0044284 | A1 * | 2/2024 | Collett ................... | F02B 33/44 |

* cited by examiner

*Primary Examiner* — Grant Moubry

(57) ABSTRACT

This invention presents an innovative technology, dedicated hybrid cycle, for dual piston based engines, which can be further developed as mobile chargers for electric vehicles. This design re-defines the single engine piston/crankshaft configuration in conventional internal combustion engines as two sets per the combustion process: Otto piston and Atkinson piston; correspondingly, there are Otto crankshaft and Atkinson crankshaft. As a matter of fact, the Atkinson crankshaft can be realized through a cam as well. The Atkinson mechanism is dedicated to accomplish high combustion efficiency, while the Otto crankshaft for engine output only. Periodically, the hybrid combination of both Atkinson and Otto cycle can significantly improve the engine efficiency and torque density. This innovative combustion mechanism is further developed for genset applications to generate electricity on the vehicles in a most efficient manner.

16 Claims, 6 Drawing Sheets

Crankshaft Based Single Cylinder Representation

Figure 1. Crankshaft Based Single Cylinder Representation
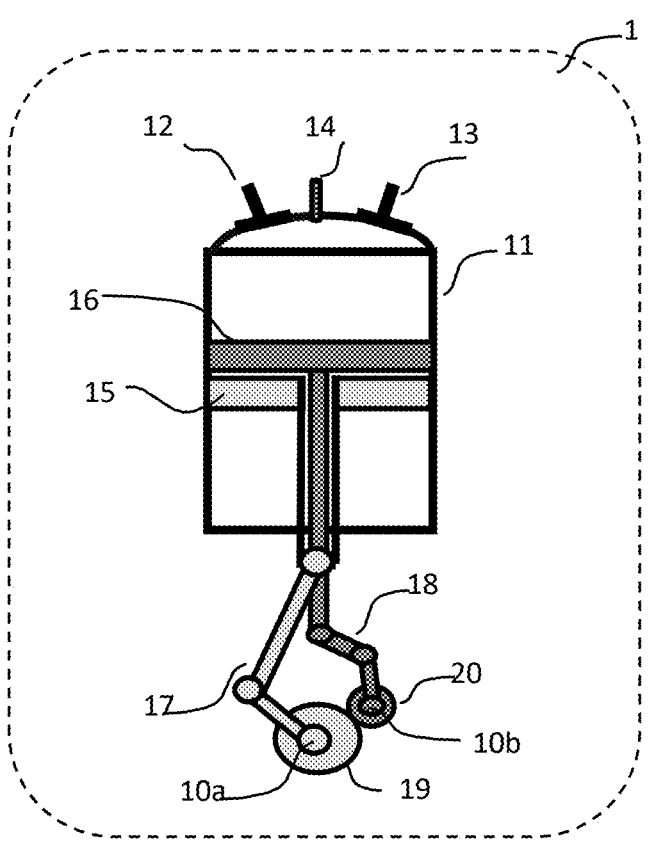

Figure 2. Atkinson Crankshaft Representations
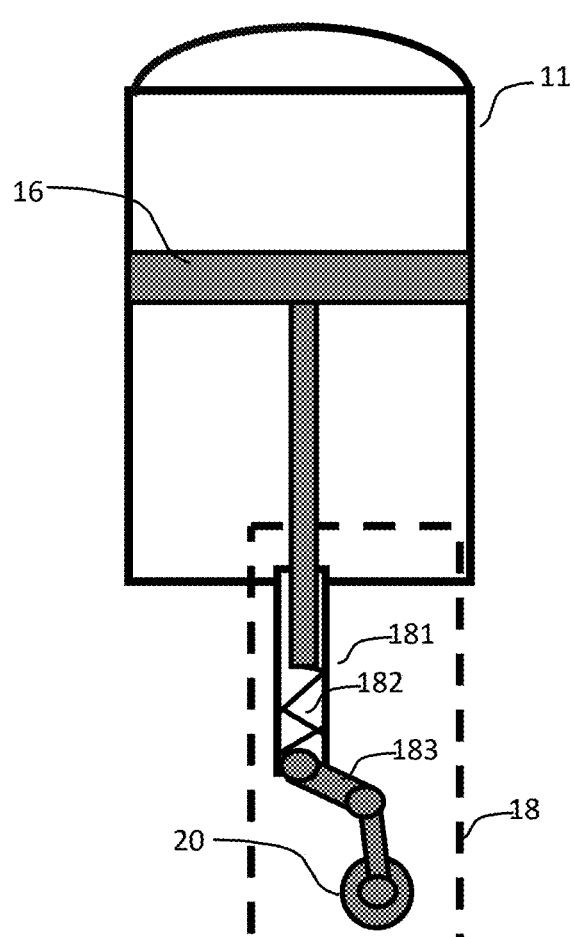

Figure 3. Cam Based Single Cylinder Representation
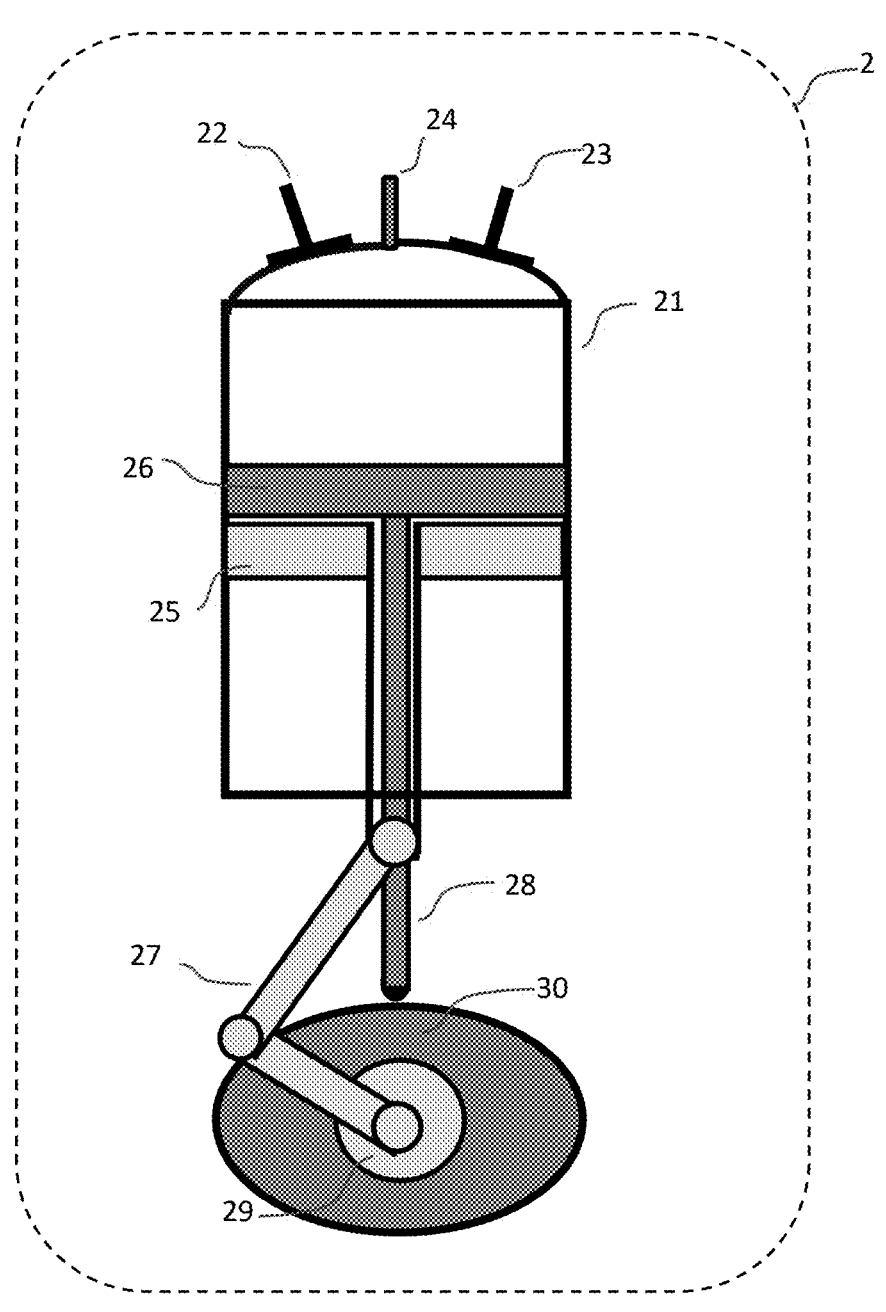

Figure 4. Representation of Eccentric Atkinson Cam with Otto Crankshaft
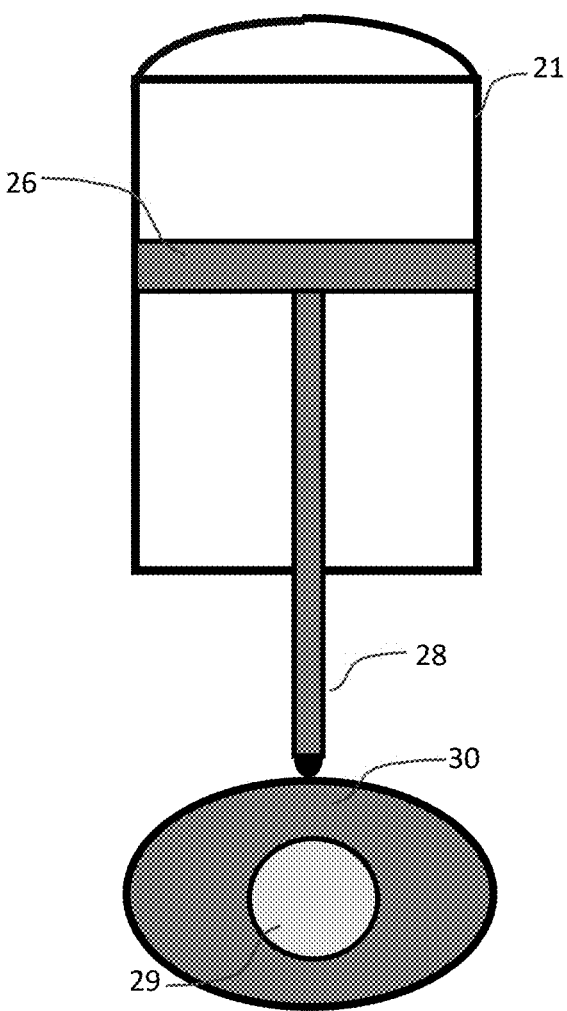

Figure 5. Dual Piston Positions Regarding TDC and BDC
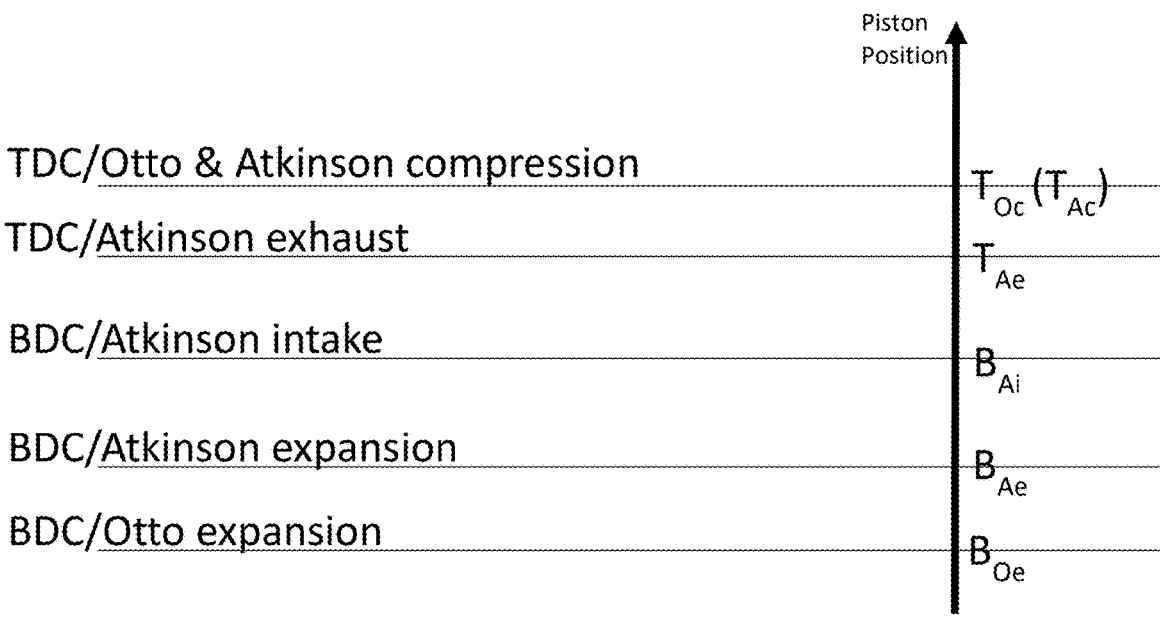

Figure 6. Genset Representations: (a) with speed increaser gear; (b) direct connection
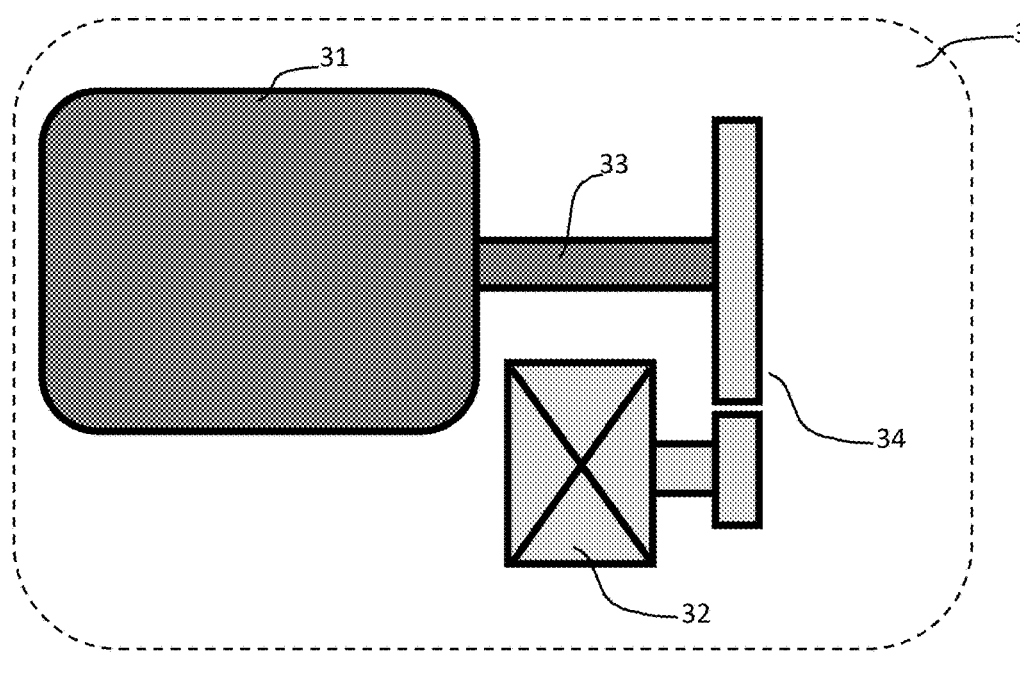
(a)
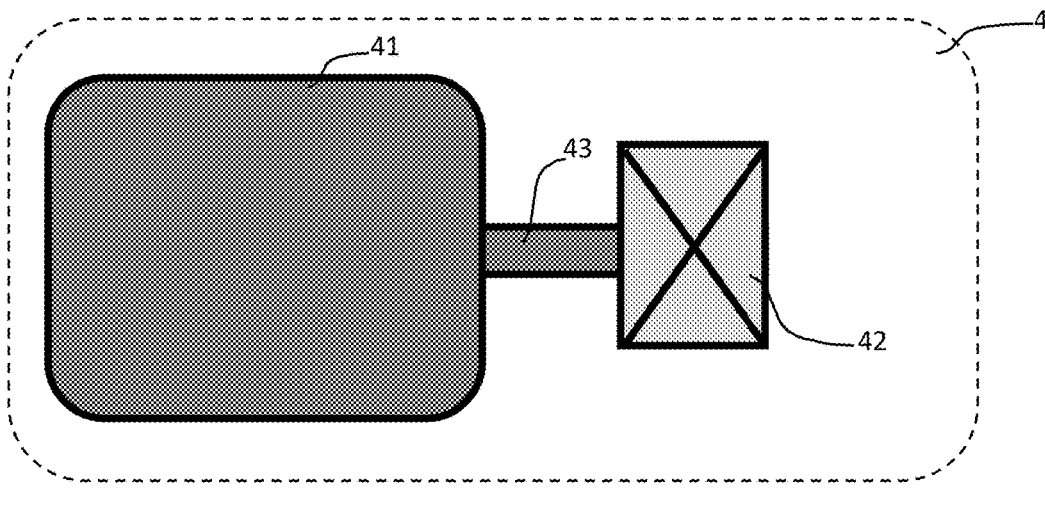
(b)

DUAL PISTON BASED GENSETS FOR VEHICLE ELECTRIFICATION

1. BACKGROUND OF THE INVENTION

Battery based electrification of light-duty cars and vehicles has gained trending advantage for commercialization at scale. For battery electric vehicles (BEV), HVAC (Heating, Ventilation, and Air Conditioning) needs to consume electricity for cabin comfort. Moreover, environmental temperatures at either extreme cold or hot conditions can deteriorate the battery performance significantly. Thus, BEVs have range anxiety overall. The low energy density of the today's battery poses another road block for electrifying commercial vehicles, especially those which have long hour usage per daily operations (such as long-haul or work trucks). Probably there will be a lack of charging infrastructure with costly stationary charging stations for the upcoming decades. Range extenders are developed dominantly by applying the four stroke engines available in the market. SI (spark ignition) is used for petrol engines with the Otto Cycle, while CI (compression ignition) with the Diesel Cycle. Either cycle has low power performing characteristics, because one power stroke per two revolutions of the engine crankshaft. Since the Otto cycle has equal stroke operation with the piston movements (referring to intake, compression, expansion/power, and exhaust), the combustion efficiency is hard to be improved. EGR (exhaust gas recirculation) complicates the engine design, though contributing to engine performance improvement. Since two stroke engines have high emissions and low durability & reliability, they are not used for the automotive industry.

2. SUMMARY OF THE INVENTION

This patent presents an innovative technology approach, "dedicated hybrid cycle (DHC)", as a prospective motive electricity generation approach for EVs by significantly boosting the brake thermal efficiency of the internal combustion engines. The piston is designed to have two pieces, Otto piston piece and Atkinson piston piece. The Otto piece is connected to the crankshaft as the output-shaft of a conventional four-stroke engine, while the Atkinson piece is designed to accommodate a longer power stroke than the compression stroke with an independent piston movement from the Otto piston piece. The top dead centers for both Otto and Atkinson piston can be different so that the burnt gas retention can be used to replace external EGR mechanism. SI and CI can be applied principally for combustion ignition as designed. Its exemplary layout goes through a genset, which can work as a mobile charger for BEVs. The synergy of DHC and carbon-neutral alternative fuels (such as bio-fuels, synthetic fuels, and e-fuels) can be a practical solution for electrifying hard-to-abate vehicles. This proposed genset, range extender (RE), can be optimized to produce the most efficient fuel-to-electricity conversion while minimizing both carbon dioxide and harmful emissions in comparison to conventional four stroke engines.

3. BRIEF DESCRIPTION OF THE DRAWINGS

FIG. 1 presents a single cylinder configuration with the crankshaft-based dual piston for internal combustion engines.

FIG. 2 depicts the layout and mechanism of the Atkinson crankshaft with the Atkinson piston.

In FIG. 3, another innovative implementation of the dual piston is carried out for a single cylinder configuration through a cam device, Atkinson cam.

FIG. 4 presents a further layout with both Atkinson piston and Atkinson cam.

Based on the dual-piston mechanism, FIG. 5 extrapolates the TDC (top dead center) and BDC (bottom dead center) of both Otto and Atkinson piston during the combustion process.

FIG. 6a presents a configuration of a genset with a speed increaser gear between the motor/generator and the engine.

FIG. 6b presents a configuration of a genset with a direct connection between the motor/generator and the engine.

4. DETAILED DESCRIPTION OF THE INVENTION

This invention provides two designs to implement the dual piston for four-stroke internal combustion engines. With two pistons inside the engine cylinders, there are two sets of crankshaft mechanisms correspondingly to accomplish the combustion process. The idea is illustrated through a single cylinder configuration of an internal combustion engine. This mechanism can be easily extended to multiple cylinder engines with spark ignition (SI) or compression ignition (CI).

The first design is shown in FIG. 1 as a single cylinder engine 1 with the engine cylinder 11. The Otto mechanism consists of Otto piston 15 and Otto crankshaft 17. Going through the gearing pair of the speed increaser gears 19 and 20 (which can be set a ratio of ½), the Atkinson mechanism of Atkinson piston 16 and Atkinson crankshaft 18 can run twice faster than the Otto mechanism. It is worth noting that the gear 19 is installed on the engine output shaft 10a. This single cylinder engine embodies intake valve 12 and exhaust valve 13 with a spark plug 14. Simply to remove the spark plug 14, then this single cylinder engine can work as a CI engine.

FIG. 2 further explains the composition of the Atkinson crankshaft 18, defined by a two-linkage mechanism, which works together with the Atkinson piston 16 within the engine cylinder 11. Due to the speed increaser gear 20, which is installed on a rigid rod 10b, the crankshaft 183 can push the spring 182 upward inside a sliding cylinder 181 so that the Atkinson piston 16 can move upward for the volume compression. In the other way, the Atkinson piston 16 can be pulled down as expansion because of the motion of the crankshaft 183. Therefore, the compression and expansion have different stroke displacements.

The other dual piston design is presented in FIG. 3 as a single cylinder engine 2, which has a layout similar to the engine 1 in FIG. 1. The engine has intake valve 22 and exhaust valve 23 with a spark plug 24. Without the spark plug 24, the engine 2 can work as a CI engine too. The Otto piston 25 moves forcibly with the Otto crankshaft 27, which is attached on an engine output-shaft 29. An ellipse-shaped cam 30, defined by an Atkinson cam, is fixed concentrically on the output-shaft 29. The cam 30 works together with the Atkinson shaft 28 to move the Atkinson piston 26 up and down. FIG. 4 further simplifies the composition of the engine cylinder 21, hosting the Atkinson piston 26 and the Atkinson shaft 28. The Atkinson cam 30 rotates together with the engine output-shaft 29. Thus, the Atkinson piston 26 can move to different positions according to the four-stroke combustion process such as intake, compression, expansion, and exhaust.

In FIG. 5, the positions of these two pistons are further exemplified to disclose the working mechanism of the dual-piston based engines. During the compression stroke, both Otto and Atkinson pistons can reach the TDC (top dead center), Toc (i.e., TAc), simultaneously. Afterwards, the Otto piston moves to the Otto expansion BDC (bottom dead center, Boe), and in the meanwhile the Atkinson piston quickly moves to complete the movements to the Atkinson expansion BAe, and then the Atkinson exhaust TDC (top dead center, TAe). With the Atkinson piston moves to the Atkinson intake position BAi and then both pistons move together to the TDC with a complete compression. It is clear that the Atkinson expansion can be designed to have a longer stroke than the Atkinson intake stroke. Thus, the combustion efficiency can be significantly improved in an efficient manner.

One of the significant applications of these dual-piston engines is to develop motive gensets for assisting vehicle electrification. Such gensets can be deployed as stationary electricity generators as well. FIG. 6 gives out two genset configurations 3 and 4. Genset 3 has included a speed increaser gear 34 on the engine output-shaft 33 between the engine 31 and the generator/motor 32. The other genset 4 has a direct connection through the output-shaft 43 between the engine 41 and the generator/motor 42. The speed increaser gear might be able to improve the genset efficiency in an optimized manner.

REFERENCES

1. Atkinson, J., "Gas engine", U.S. Pat. No. 336,505, Feb. 16, 1886
2. Atkinson, J., "Gas engine", U.S. Pat. No. 367,496, Aug. 2, 1887
3. Yan, M. J., "Accommodating Piston Seat for Differential-stroke cycle engines," U.S. Pat. No. 8,739,754 B2, Jun. 3, 2014
4. Yan, M. J., "Accommodating Piston Seat for Differential-stroke cycle engines," U.S. Pat. No. 9,133,763 B2, Sep. 15, 2015
5. Song, X., Prucka, R., Spitas, C., And Mohammadpour, M., "Editors' Perspectives: Synergistic Technologies For Dedicated Hybrid Powertrains," International Journal Of Powertrains (IJPT), Vol. 10, No. 4, 2021, 395-439, DOI: 10.1504/IJPT.2021.10045243
6. Vishnu Nair, Gary Rogers, "Gasoline Engine Technologies for Revised 2023 and Later Model Year Light-Duty Vehicle Greenhouse Gas Emission Standards," Final Report, Roush, Sep. 24, 2021

The invention claimed is:

1. An engine apparatus comprising:

an engine having at least one cylinder;

an engine output shaft including a first speed increaser gear;

an Otto piston assembly comprising an Otto piston coupled via an Otto crankshaft to the engine output shaft;

an Atkinson piston assembly comprising an Atkinson piston, a sliding cylinder, and a spring disposed within the sliding cylinder for biasing the Atkinson piston assembly during reciprocating movement of the Atkinson piston;

wherein said Atkinson piston assembly further comprising a second speed increaser gear meshing with the first speed increaser gear and, together with the first speed increaser gear, is configured to increase an operational speed of the Atkinson piston based on a gear ratio; and

wherein said Atkinson piston assembly further comprising an Atkinson crankshaft defined by a two-linkage mechanism coupling the second speed increaser gear to a rigid rod.

2. An engine apparatus comprising:

an engine having at least one cylinder;

an engine output shaft including an ellipse-shaped cam defined by an Atkinson cam;

an Otto piston assembly comprising an Otto piston coupled via an Otto crankshaft to the engine output shaft; and an Atkinson piston assembly comprising an Atkinson piston coupled via an Atkinson shaft and an Atkinson cam to the engine output shaft.

3. A genset apparatus, wherein said genset apparatus comprising:

a range extended system;

the engine apparatus according to claim 1;

a motor/generator coupled together through a direct rigid connection.

4. A genset apparatus comprising:

the engine apparatus according to claim 2;

a range extended system;

a motor/generator coupled together through a direct rigid connection.

5. A genset apparatus comprising:

the engine apparatus according to claim 1;

a range extended system;

a motor/generator coupled through the speed increaser gear, configured to increase an operational speed of the motor/generator based on a gear ratio.

6. The engine apparatus according to claim 1, wherein the at least one cylinder comprises a plurality of cylinders defining a multiple cylinder engine.

7. The engine apparatus according to claim 2, wherein the at least one cylinder comprises a plurality of cylinders defining a multiple cylinder engine.

8. The engine apparatus according to claim 1 or 2, further comprising a dual-piston mechanism configured to improve the brake thermal efficiency (BTE) and torque capacity of said engine, ranging from idle speed to maximum speed, regardless of stoichiometric combustion, lean burn, spark ignition or compression ignition.

9. The engine apparatus according to claim 1, wherein the Atkinson crankshaft is configured to create a longer expansion stroke than an intake stroke.

10. The engine apparatus according to claim 2, wherein the Atkinson cam is configured to create a longer expansion stroke than an intake stroke.

11. The engine apparatus according to claim 1 or 2, wherein the Atkinson piston is configured to enable burnt gas retention (BGR).

12. The engine apparatus according to claim 1 or 2, further comprising a dual-piston mechanism configured to accommodate low temperature combustion (LTC) with burnt gas retention (BGR) features through varying an exhaust position of the Atkinson piston.

13. The engine apparatus according to claim 1 or 2, further comprising a dual-piston mechanism configured to run at lean-burn with spark ignition.

14. The genset apparatus according to claim 3, wherein the at least one cylinder comprises a plurality of cylinders defining a multiple cylinder engine, wherein the range extender system is implemented in the multiple cylinder engine.

15. The genset apparatus according to claim 4, wherein the at least one cylinder comprises a plurality of cylinders defining a multiple cylinder engine, wherein the range extender system is implemented in the multiple cylinder engine.

16. The genset apparatus according to claim 5, wherein the at least one cylinder comprises a plurality of cylinders defining a multiple cylinder engine, wherein the range extender system is implemented in the multiple cylinder engine.

* * * * *